O. FRASCHINI.
VEHICLE BRAKE.
APPLICATION FILED FEB. 13, 1911.

1,103,751.

Patented July 14, 1914.
2 SHEETS—SHEET 1.

Witnesses:

Inventor
Oreste Fraschini
by
James L. Norris,
Atty

O. FRASCHINI.
VEHICLE BRAKE.
APPLICATION FILED FEB. 13, 1911.
1,103,751.
Patented July 14, 1914.
2 SHEETS—SHEET 2.
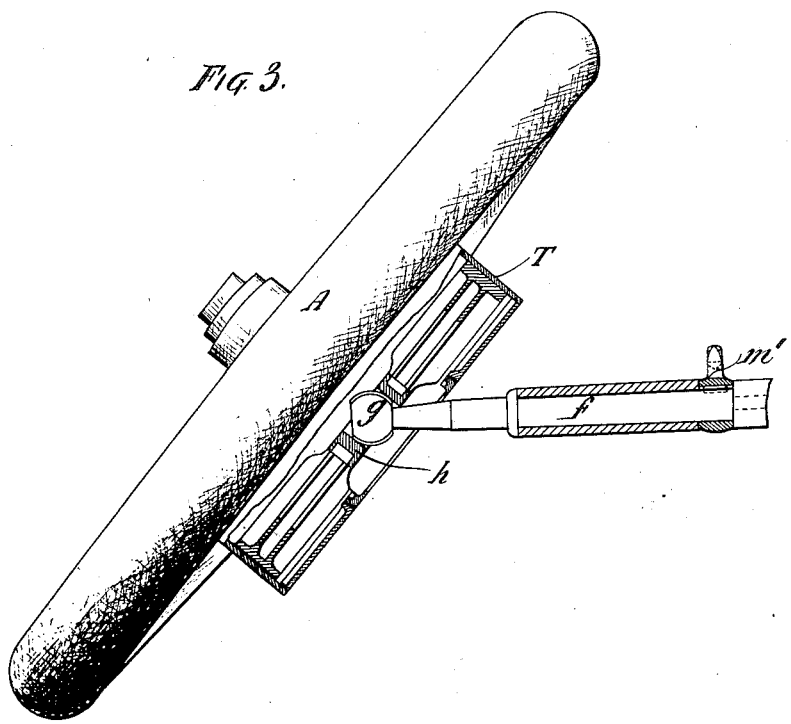
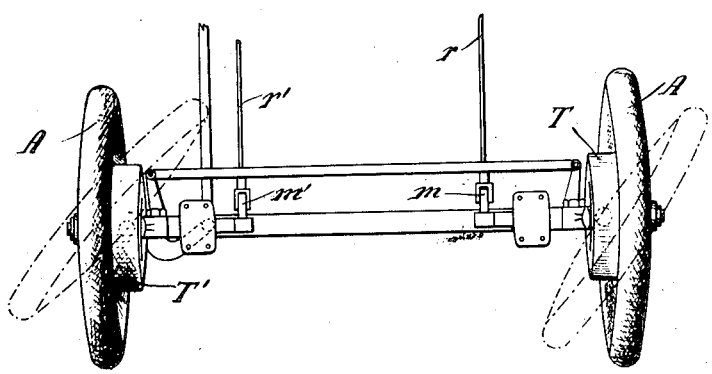

UNITED STATES PATENT OFFICE.

ORESTE FRASCHINI, OF MILAN, ITALY.

VEHICLE-BRAKE.

1,103,751. Specification of Letters Patent. Patented July 14, 1914.

Application filed February 13, 1911. Serial No. 608,279.

*To all whom it may concern:*

Be it known that I, ORESTE FRASCHINI, a subject of the King of Italy, residing at 79 Via Monterosa, Milan, in the Kingdom of Italy, have invented certain new and useful Improvements in Vehicle-Brakes, of which the following is a specification.

The use of brakes on the front steering wheels of automobile vehicles has heretofore been difficult and complicated in view of the fact that the mechanism for steering the wheels must necessarily be independent of the operation of the brakes. In other words, the movement of the steering gear for the wheels must never influence in any way the operation of the brakes and vice versa. The device which forms the object of the present invention solves this problem in an exceedingly simple manner. This device is represented diagrammatically in the accompanying drawing which illustrates one of its applications by way of example.

It will of course be understood that constructional details can be modified and that such other modifications as are necessary in view of the use of other types of brake might be adopted without departing from the limits of the invention.

Figure 1:
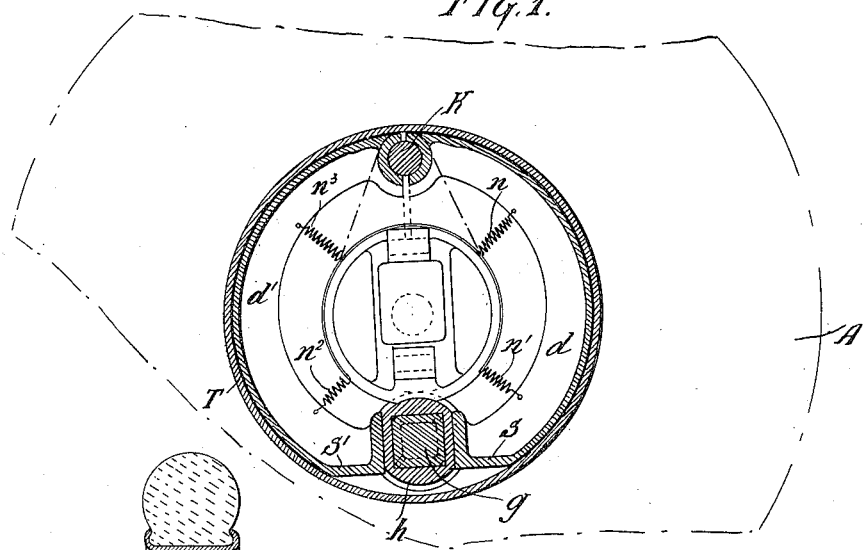
Figure 2:
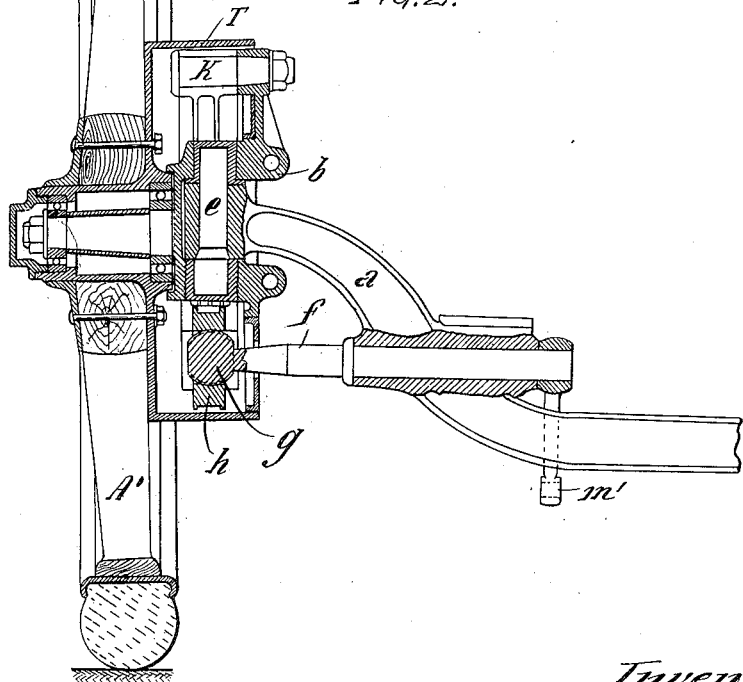

Figure 1 is a front elevation showing the brake fitted to one of the drums mounted on the spindle. Fig. 2 shows the wheel and the brake in section. Fig. 3 represents a wheel in process of turning and the brake in section. Fig. 4 is a general plan view of the front axle and wheels.

Taking by way of example an expansion brake which acts by means of two brake shoes $d$ $d'$ on the interior of the drum T fixed to the spokes A' of the front steering wheel A the two shoes are articulated at their upper ends to a pivot K fixed to the hinged arm $b$ which forms part of the spindle of the wheel. The lower ends $s$, $s'$ of the shoes are pressed inwardly against the cam $h$ under the influence of the springs $n$ $n'$ $n^2$ $n^3$. When the brake is inoperative the said ends $s$ $s'$ bear upon the two flat faces of the cam $h$ which are nearest to the center of said cam, but when the latter is turned, the said shoe ends are forced away from each other and consequently the shoes are applied to the inner periphery of the drum T and act as a brake.

In order to permit the wheel to oscillate on the pivot $e$ without influencing the brakes it is necessary that the cam $h$ or other device for acting upon the brake shoes should not experience any displacement at any steering angle whatever. Similarly it should be possible to act freely upon the brakes whatever the position of the wheel may be. This result is obtained in the following manner: A pivot $f$ supported and guided for example by the axle $a$ which carries the wheel A is provided at its extremity with a member $g$ which is in the form of a substantially rectangular body or portion provided with rounded ends. The center of the member $g$ is located in line with or very nearly in line with the axis of the pivot $e$ on which the wheel oscillates. The said member $g$ enters a square hole located at the center of the cam $h$. This constitutes a perfect Cardan joint which enables any movement of rotation to be transmitted from the pivot $f$ to the cam $h$ whatever the angle of inclination between the pivot $f$ itself and the horizontal axis of the cam may be (Fig. 3). The Cardan joint may also be of the type comprising fixed pivots or nuts or of any other type. In the case represented in the drawing the member $g$ might also act directly upon the ends $s$ $s'$ of the shoes thus acting as a cam.

Fig. 4 represents diagrammatically the front axle as a whole with brakes fitted to each wheel. The levers $m$ $m'$ serve to control the two pivots $f$. By acting upon the two rods $r$ $r'$ by means of a pedal or of a hand lever the two brakes are operated thus braking the entire forecarriage.

What I claim and desire to secure by Letters Patent of the United States is:—

1. A device for controlling brakes fitted to the steering wheels of vehicles comprising, in combination with an axle, and a revoluble and oscillatory wheel connected thereto; a drum connected to said wheel; a member carried by said axle; a pair of brake shoes pivoted to said member; an apertured, rotatable cam having curved and flat faces thereon; and a second cam oscillating within the aperture in the first cam and adapted to operate the same in such a manner as to produce the braking of the wheels at any angle.

2. A device for controlling brakes fitted to the steering wheels of vehicles comprising, in combination with an axle, and a revoluble and oscillatory wheel connected thereto; a drum connected to said wheel; a member carried by said axle; a pair of brake shoes pivoted to said member; a cam situated between the ends of said shoes; and a member movably connected to said cam and adapted to move in relation thereto for operating the cam.

3. A device for controlling brakes fitted to the steering wheels of vehicles comprising, in combination with an axle, and a revoluble and oscillatory wheel connected thereto; a drum connected to said wheel; a member carried by said axle; a pair of brake shoes pivoted to said member and having flanged ends; a cam situated between the flanged ends of said brake shoes; and an internal member oscillating within said cam and adapted to operate the same when rotated.

4. A device for controlling brakes fitted to the steering wheels of vehicles comprising, in combination with an axle, and a revoluble and oscillatory wheel connected thereto; a drum connected to said wheel; a member carried by said axle; a pair of brake shoes pivoted to said member; an apertured, rotatable cam having curved and flat faces thereon; an oscillatory member mounted in the aperture in said cam; and a shaft having a fixed axis of rotation connected to the oscillatory member for rotating the same and said cam.

In testimony whereof I affix my signature in presence of two witnesses.

ORESTE FRASCHINI.

Witnesses:
R. CARLO SALVOTIE,
P. DE FEARINOS.